April 16, 1935.  E. J. WINDLE  1,997,619
DRAG SAW
Filed Aug. 30, 1933  2 Sheets-Sheet 1
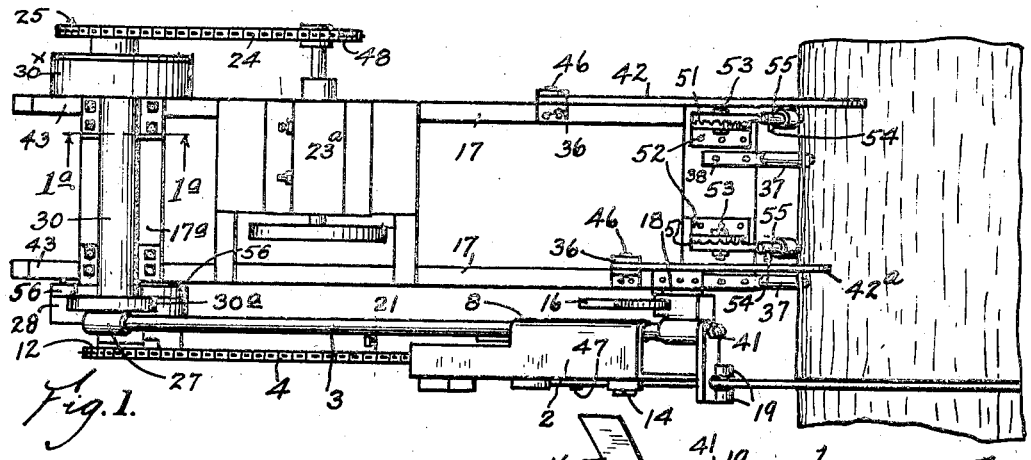
Fig. 1.
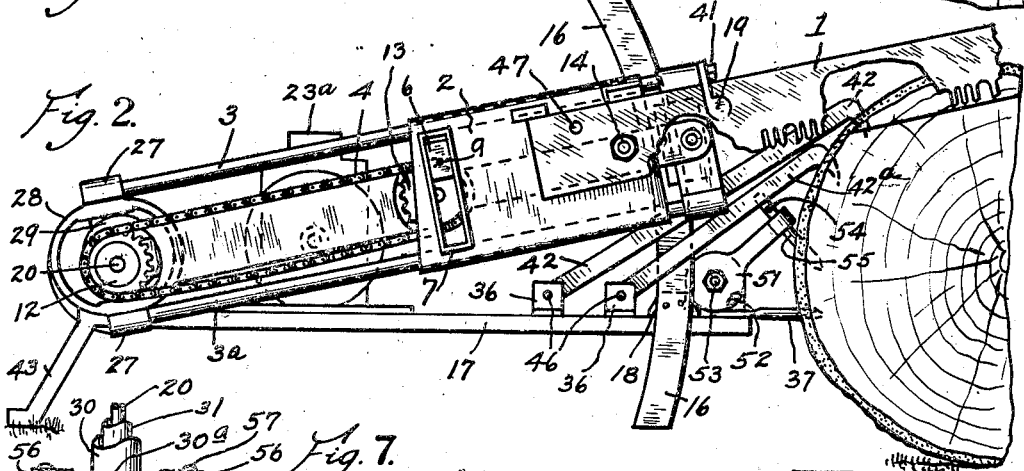
Fig. 2.
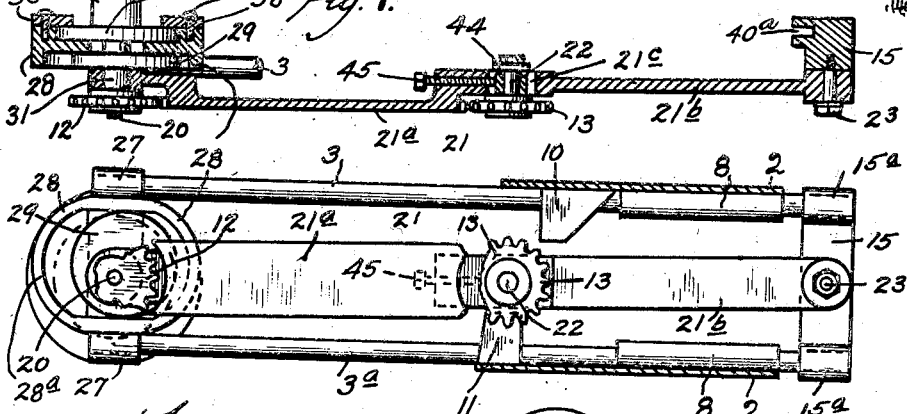
Fig. 7.
Fig. 6.
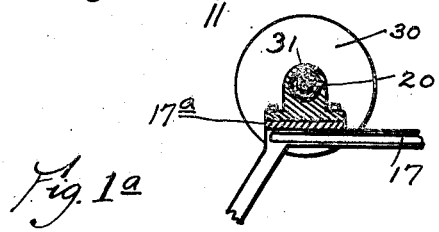
Fig. 1a.
Inventor.
Edward J. Windle
by J. Geisler
Attorney

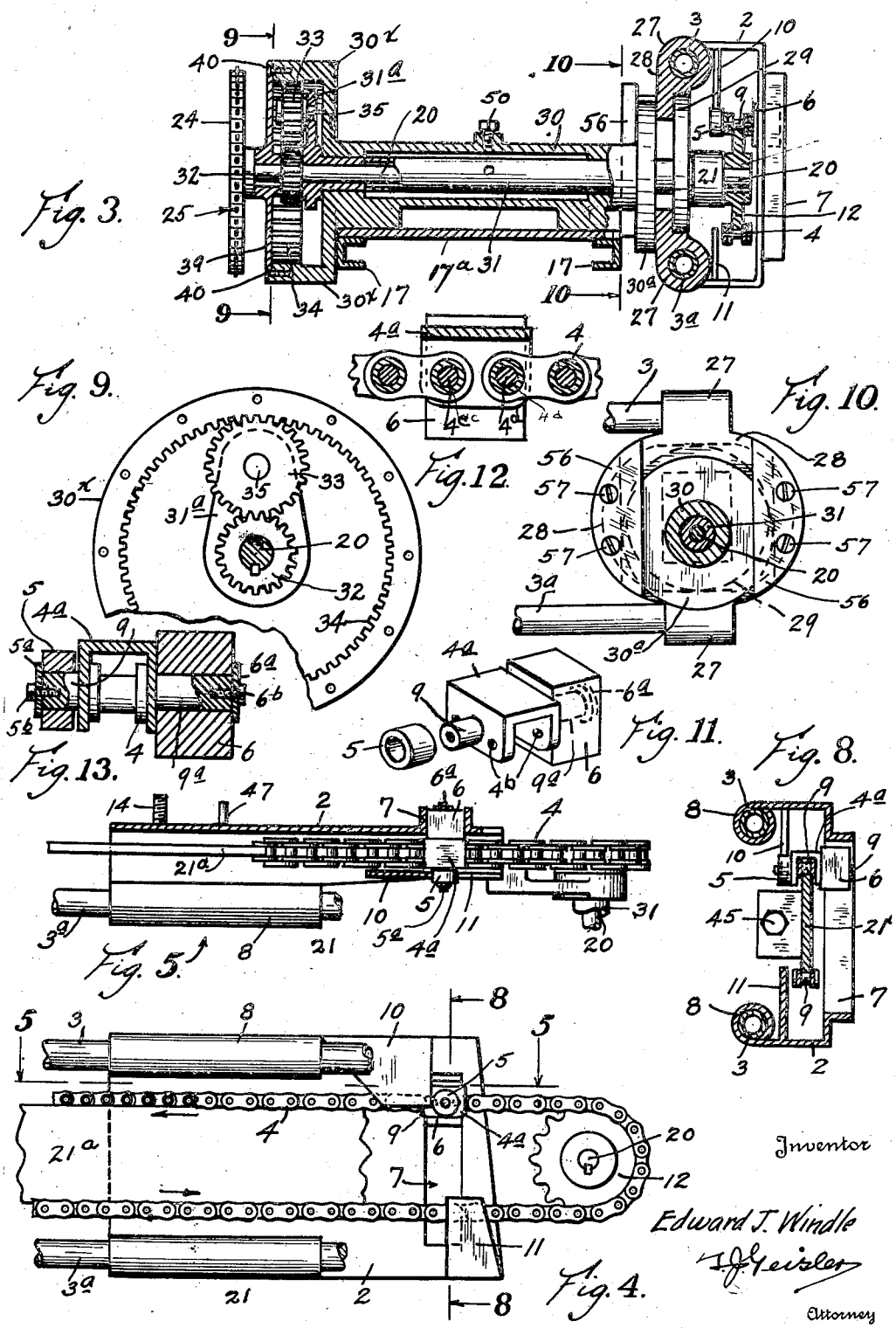

Patented Apr. 16, 1935

1,997,619

UNITED STATES PATENT OFFICE 1,997,619

DRAG SAW

Edward J. Windle, Portland, Oreg.

Application August 30, 1933, Serial No. 687,388

7 Claims. (Cl. 143—68)

My invention relates to drag saws of the type comprising a reciprocated cross head, operated by a driving sprocket chain; the saw being attached to the cross head.

One of the main objects of my invention is to provide a drag saw of the type mentioned in which all side strains on the sprocket or drive chain are avoided; in other words, cause the pull on the drive chain to be equal on both sides, thereby preventing distortion, and minimizing wear of the chain; also eliminating the binding of the cross head on the guide members of the frame on which it reciprocates.

A further object of my invention is to provide the frame of my drag saw with means by which the drag saw as a whole may be supported from the log on which it is to operate.

A further object of my invention is to provide a compact light weight drag saw of simple and durable construction; and further, in which the driving devices are inclosed, so as to protect these working parts from dirt and weather.

A particular feature of my invention is the sprockets and chain of the saw operating devices have a direct lineal motion; and I avoid the use of an angular crank, which causes an angular pull and strain of cross head on the guide rods. By said arrangement I have reduced the length of my drag saw, made it lighter, therefore more portable; and said arrangement further enables the use of a smaller motor.

The devices by which I attain the above mentioned objects, and incidental features, are hereinafter fully described with reference to the accompanying drawings.

In these drawings:

Fig. 1 shows a top, or plan view of my drag saw supported on the log to be sawed;

Fig. 1a shows a section on the line 1a—1a of Fig. 1;

Fig. 2 shows a front side elevation of my drag saw with respect to Fig. 1;

Fig. 3 shows a larger scale, transverse, vertical section taken axially to the drive shaft looking at the left end of my drag saw as shown by Fig. 1;

Fig. 4 shows a fragmentary rear side elevation of the saw arm of my drag saw, the driven chain, and the cross head, to which the saw is attached;

Fig. 5 shows a horizontal section on the line 5—5 of Fig. 4;

Fig. 6 shows a front elevation of the saw arm;

Fig. 7 shows a horizontal section taken centrally thru the saw arm with reference to Fig. 6;

Fig. 8 shows a section on the line 8—8 of Fig. 4;

Fig. 9 shows a section on line 9—9 of Fig. 3;

Fig. 10 shows a section on line 10—10 of Fig. 3; and

Figs. 11, 12 and 13 show details of construction hereinafter described.

My drag saw consists of main supporting frame 17, comprising spaced angle bars. This frame is provided with legs 43 at one end as shown by Figs. 1 and 2, so that, if desired, one end of my drag saw may rest on the ground, or other convenient support. Or, the main frame may be fastened to, and suspended from the log by pins 37 secured in place by rivets 38, and dogs 42, 42a, as illustrated by Fig. 2. The dogs 42 and 42a are pivoted to lugs 36 by pins 46 and made of unequal length so that dog 42 may be used to suspend the drag saw from the log, and the dogs 42a used to hold the drag saw to the log against the thrust of the saw blade 1.

One end of the frame 17 has a plate 17a on which is mounted a tubular housing 30. This housing is formed with an annular, hollow head 30x at one end, which head is provided with internal peripheral gear teeth 34. In said housing 30 is journaled a hollow shaft 31, provided at one end with a crank arm 31a, carrying the planetary gear 33. In said hollow shaft is journaled the drive shaft 20, see Fig. 3. A drive gear 32, keyed on the drive shaft 20, meshes with the planetary gear 33, which meshes with said internal gear teeth 34 of the hollow head 30x, thus revolving said crank arm 31a, and therewith the hollow shaft 31. The hollow shaft has at its other end an eccentric 29. A cover plate 39 is fastened to the housing 30 by screws 40. The housing 30 is provided with a lubricating hole 50.

On said eccentric 29 is mounted an eccentric strap 28 provided with lugs 27 to which is fastened one end of the saw arm assembly. This comprises a guide frame 21 consisting of guide rods 3, 3a, connected at their inner ends to said strap 28, and connected at their outer ends to the lugs 15a of cross bar 15, and a sprocket supporting member 21a having an offset extension 21b.

The inner end of said sprocket supporting member 21a is supported on the hollow shaft 31.

The outer end of said extension 21b of the sprocket supporting member 21a is pivotally supported by pin 23 on said cross bar 15, thus permitting the guide rods 3 and 3a to oscillate in relation to the sprocket 12 carrying one end of the sprocket chain 4.

To the eccentric strap 28 are secured plates 56 by screw bolts 57, such plates formed to constitute a box on the eccentric strap 28 in which bears the flange 30a of the housing 30, thereby holding the eccentric strap in place, see Figs. 3, 7 and 10.

The eccentric strap 28 rotating on housing flange 30a, serves as a pivot and causes the saw arm assembly and therewith the saw to be oscillated vertically at one end, but prevents any lateral motion of saw arm.

A cross head 2 is reciprocably mounted on said guide rods 3, 3a of the guide frame 21 by sleeves 8, an integral part of the cross head. Saw 1 is fastened to the cross head 2 by bolt 14 and pin 17.

The cross head 2 is reciprocated by a sprocket chain 4 running on the drive and idler sprockets 12, 13. The sprocket supporting member 21a of the saw arm is formed with a bearing at one end in which said hollow shaft 31 rotates.

The drive sprocket 12 is fast on the drive shaft 20, which projects beyond the hollow shaft 31; and the idler sprocket 13 is carried by the sprocket supporting member 21a; see Figs. 6 and 7. Said sprocket carries the sprocket chain 4.

The idler sprocket 13 is mounted on sprocket spindle 22, on which spindle is a loose collar or bushing 44. The sprocket supporting member 21a is provided with a slot 21c in which the said sprocket spindle is slidable, and an adjustment screw 45 provides the means for adjusting said sprocket spindle to tighten the sprocket chain.

The eccentric strap 28 does not describe a circle but is elongated laterally, as at 28a on both sides. Hence the eccentric 29 in revolving does not move the saw guide frame 21 longitudinally, but merely imparts perpendicular motion relatively to its longitudinal axis; thus rocks the saw, and clears the kerf cut by it, of sawdust. The outer end of the saw arm is guided by the quadrant 16 fastened on the saw frame by plate 18. Said quadrant slides in the slot 40a of the cross bar 15, thus allows the outer end of the saw 1 to descend as it cuts thru the log.

Saw guide 19 is fastened to the cross bar 15 by bolts 41, to restrain lateral vibration of the saw.

The sprocket chain 4 has an inverted U-shaped link 4a which is cast on both sides with trunnions 9 and 9a. The link 4a is provided with holes 4b to receive pins 4c, 4d, (see Fig. 12) pivotally connecting it to the adjacent links of the sprocket chain. On the trunnion 9 is rotatably mounted a roller 5, and on the trunnion 9a is pivotally mounted a block 6.

The block 6 and roller 5 are held in place by washers 5a, 6a, respectively; the washers being secured in place by screws 5b and 6b threaded into said trunnions, as more clearly shown by Fig. 13.

The cross head 2 has a transverse guide slot 7 in which said guide block 6 bears. The cross head is provided with an upper and lower drive lug 10, 11, arranged to be engaged by said roller 5 and guide block 6 in the travel of the sprocket chain, thus to reciprocate the cross head, said lugs 10 and 11 being spaced to pass over drive shaft 20 and sprocket spindle 22. The guide block 6 by moving in said guide slot 7 of the cross head 2 guides the inverted U-shaped link 4a of the sprocket chain over the sprockets 12 and 13 and prevents binding.

The guide block 6, bearing in the guide slot 7 of the cross head, and the roller 5 being engaged by either of the lugs 10 or 11 of the cross head, cause the pull upon the sprocket chain to be equal on both sides, thereby preventing its distortion and wear, also preventing the cross head 2 from binding on the guide rods 3, 3a of the guide frame.

When my drag saw is not suspended from the log to be cut, but instead supported on the legs 43 of the main frame, the opposite end of the saw frame is secured to the log by the adjustable pins 55 carried by the arms 51.

The arms 51 are adjustably affixed to brackets 52 mounted on the saw frame; the opposed faces of said brackets and arms being provided with radial grooves to permit their relative adjustment about the connecting bolts 53, thus permitting the adjustment of the arms 51 at any desired angle. The pins 55 are loosely fitted in holes of the holding arm 51, so that after the saw is in position the pins 55 may be driven into the log, as shown by Fig. 2. Transverse pins 54 serve to facilitate the removal of the pins 55 from the log.

Power for operating the saw arm is supplied by a motor as indicated by 23a in Figs. 1 and 2, mounted on the main frame 17. The motor is connected with drive shaft 20 by chain 24 running on sprockets 25 and 48.

The drawings and foregoing description merely illustrate one operative embodiment of my invention.

I claim:

1. In a drag saw a driven shaft, a drive sprocket mounted on said shaft, a saw arm assembly comprising a guide frame and a sprocket supporting member, the inner end of such member supported by a bearing on said driven shaft, the outer end of said member pivotally supported by said guide frame, said member supporting an idler sprocket, means supporting the inner end of said guide frame for oscillation, in a vertical plane, a sprocket chain running on said sprockets, a cross head reciprocable on said guide frame, said cross head adapted to have a saw blade fastened thereon, said sprocket chain provided with a link, a block pivoted to one side of a link of said sprocket chain, and a roller carried by the other side of said link, said cross head provided with a slot in which said block bears, and provided with upper and lower drive lugs, adapted to be engaged by said roller of the sprocket chain, said lugs spaced to pass over said sprocket supporting member.

2. In a drag saw a driven shaft, a drive sprocket mounted on said shaft, a saw arm assembly comprising a guide frame and a sprocket supporting member, the inner end of such member supported by a bearing on said shaft, the outer end of said member pivotally supported by said guide frame, said member supporting an idler sprocket, means supporting the inner end of said guide frame for oscillation in a vertical plane, a sprocket chain running on said sprockets, a cross head reciprocable on said guide frame, said cross head adapted to have a saw blade fastened thereon, said sprocket chain provided with an inverted U-shaped link, a block pivoted to one side of a link of said sprocket chain, and a roller carried by the other side of said link, said cross head provided with a slot in which said block bears, and provided with upper and lower drive lugs, adapted to be engaged by said roller of the sprocket chain, said lugs spaced to pass over said sprocket supporting member.

3. In a drag saw, a supporting frame, a housing mounted on said frame, said housing provided with an annular hollow head having internal gear teeth, a hollow shaft journaled in said housing, a drive shaft journaled in said hollow shaft, the hollow shaft provided with a crank arm revolving within said hollow head, planetary gearing carried by said crank arm, meshing with said internal gear teeth, an eccentric carried by said hollow shaft, an eccentric strap mounted on said eccentric, a saw arm assembly supported at one end by said eccentric strap, said saw arm assembly including a guide frame and a sprocket supporting member, one end of such member supported for pivoting about the axis of rotation of said drive sprocket, the other end of said member pivotally supported by said guide frame, said eccentric strap adapted to transmit oscillatory motion in a vertical plane to the inner end of said guide frame, means included in the eccentric element for restraining said guide frame against longitudinal and lateral movement, an idler sprocket carried by said sprocket supporting member and a sprocket chain passing around said idler sprocket and said drive sprocket, a cross head reciprocable on said guide frame, said cross head adapted to have a saw blade fastened thereon, an operating connection between both sides of the sprocket chain and the cross head adapted to effect an even pull on both sides of the sprocket chain.

4. In a drag saw, a supporting frame, a housing mounted on said frame, said housing provided with an annular hollow head having internal gear teeth, a hollow shaft journaled in said housing, a drive shaft journaled in said hollow shaft, the hollow shaft provided with a crank arm revolving within said hollow head, planetary gearing carried by said crank arm, meshing with said internal gear teeth, an eccentric carried by said hollow shaft, an eccentric strap mounted on said eccentric, and a saw arm assembly supported at one end by said eccentric strap.

5. The combination described by claim 4 with said saw arm assembly including a guide frame and a sprocket supporting member, one end of such member supported for pivoting about the axis of rotation of said drive sprocket, the other end of said member pivotally supported by said guide frame.

6. The combination described by claim 4 with said saw arm assembly including a guide frame and a sprocket supporting member, one end of such member supported for pivoting about the axis of rotation of said drive sprocket, the other end of said member pivotally supported by said guide frame, and said eccentric strap adapted to transmit oscillatory motion in a vertical plane to the inner end of said guide frame.

7. The combination described by claim 4 with said saw arm assembly including a guide frame and a sprocket supporting member, one end of such member supported for pivoting about the axis of rotation of said drive sprocket, the other end of said member pivotally supported by said guide frame, said eccentric strap adapted to transmit oscillatory motion in a vertical plane to the inner end of said guide frame, and means included in the eccentric element for restraining said guide frame against longitudinal and lateral movement.

EDWARD J. WINDLE.